United States Patent
Kim et al.

(10) Patent No.: US 8,217,143 B2
(45) Date of Patent: Jul. 10, 2012

(54) FABRICATION OF METAL NANOSHELLS

(75) Inventors: Jae-Woo Kim, Newport News, VA (US); Sang H. Choi, Poquoson, VA (US); Peter T. Lillehei, Yorktown, VA (US); Sang-Hyon Chu, Newport News, VA (US); Yeonjoon Park, Yorktown, VA (US); Glen C. King, Yorktown, VA (US); James R. Elliott, Jr., Yorktown, VA (US)

(73) Assignees: National Institute of Aerospace Associates, Hampton, VA (US); The United States of America as represented by the Administration of NASA, Washington, DC (US)

( * ) Notice: Subject to any disclaimer, the term of this patent is extended or adjusted under 35 U.S.C. 154(b) by 1224 days.

(21) Appl. No.: 11/827,567

(22) Filed: Jul. 12, 2007

(65) Prior Publication Data

US 2008/0014621 A1 Jan. 17, 2008

Related U.S. Application Data

(60) Provisional application No. 60/830,749, filed on Jul. 13, 2006.

(51) Int. Cl.
*C07K 14/00* (2006.01)
(52) U.S. Cl. ........................................ 530/350; 977/729
(58) Field of Classification Search .................... None
See application file for complete search history.

(56) References Cited

OTHER PUBLICATIONS

Kim et al., "Cobalt oxide hollow nanoparticles derived by bio-templating", Chem. Commun. Aug. 2005 32: 4101-4103.*

* cited by examiner

*Primary Examiner* — Anand Desai
(74) *Attorney, Agent, or Firm* — George F. Helfrich; Kimberly A. Chasteen; Thomas K. McBride, Jr.

(57) ABSTRACT

Metal nanoshells are fabricated by admixing an aqueous solution of metal ions with an aqueous solution of apoferritin protein molecules, followed by admixing an aqueous solution containing an excess of an oxidizing agent for the metal ions. The apoferritin molecules serve as bio-templates for the formation of metal nanoshells, which form on and are bonded to the inside walls of the hollow cores of the individual apoferritin molecules. Control of the number of metal atoms which enter the hollow core of each individual apoferritin molecule provides a hollow metal nonparticle, or nanoshell, instead of a solid spherical metal nanoparticle.

6 Claims, 5 Drawing Sheets

FABRICATION OF METAL NANOSHELLS

CROSS-REFERENCE TO RELATED APPLICATION

This application claims the benefit of U.S. Provisional Application No. 60/830,749, filed on Jul. 13, 2006 for "Fabrication of Metal Nanoshells Derived By A Biotemplate."

STATEMENT REGARDING FEDERALLY SPONSORED RESEARCH OR DEVELOPMENT

The U.S. Government has a paid-up license in this invention and the right in limited circumstances to require the patent owner to license others on reasonable terms, as provided for by the terms of Contract No. NCC-1-02043 awarded by the National Aeronautics and Space Administration, and Science and Technology Corporation Contract No. L-71407D.

BACKGROUND OF THE INVENTION

1. Field of the Invention

This invention relates generally to nanoscale particles. It relates particularly to a process for fabricating hollow metal nanostructures, or metal nanoshells, employing ferritin as a bio-template.

2. Description of Related Art

A great interest currently exists in the synthesis and characterization of hollow metal nanostructures, because of their surface properties and catalytic activities, which are different from their solid counterparts. Most early work in this field involved hollow nanostructures of several hundreds of nanometers. Recently, the preparation of hollow nanostructures on the scale of tens of nanometers was demonstrated, employing a replacement reaction with a solid silver template and a nonoscale Kirkendall effect, respectively. However, such a fabrication process is very complicated, and requires the use of organic solvents. Moreover, it has been found generally difficult to form stable hollow metal nanoparticles, and even solid metal nanoparticles, because of strong magnetic interactions in magnetic particle systems.

BRIEF SUMMARY OF THE INVENTION

Accordingly, it is a primary object of the present invention to provide what is not available in the art, viz., an uncomplicated, yet highly efficacious process for the fabrication of hollow metal nanostructures, or metal nanoshells, which process does not require the employment of organic solvents or other reagents which present handling difficulties. Moreover, it is another primary object of the present invention to provide a process which produces hollow metal nanoparticles which are stable.

These primary objects and their attending benefits are achieved by providing a process for the fabrication of metal nanoshells, which process includes employing apoferritin protein molecules in aqueous solution to act as biotemplates in the formation of hollow metal nanoparticles, and to function as separators between the hollow metal nanoparticles, once they have been formed. In the present process the empty cores of the apoferritin protein molecules are reconstituted with a metal, esp. a transition metal. Controlling the number of metal atoms introduced into each apoferritin molecule results in the formation of a metal nanoshell within each apoferritin protein molecule, instead of the formation of a solid metal nanoparticle therein, which would otherwise result.

Potential applications of the metal nanoshells include enhanced MRI diagnostic contrast agents, tumor hyperthermia therapies, retinal detachment therapies, and magnetic field-guided drug delivery systems and radioactive therapies.

BRIEF DESCRIPTION OF THE SEVERAL VIEWS OF THE DRAWINGS

For a more complete understanding of the present invention, including its primary objects and attending benefits, reference should be made to the DETAILED DESCRIPTION OF THE INVENTION, which is set forth below. This Detailed Description should be read together with the accompanying Drawings, wherein.

DETAILED DESCRIPTION OF THE INVENTION

Figure 1A:
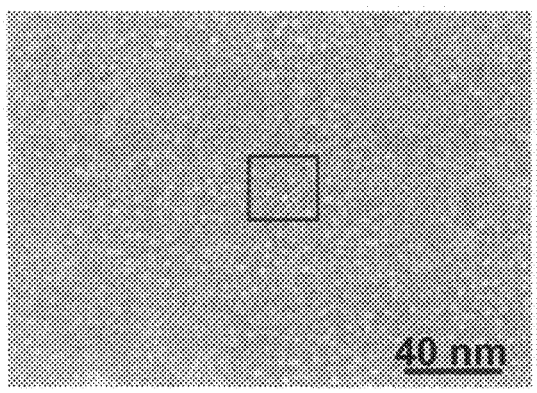
FIG. 1A and FIG. 1B are drawings prepared from field emission-scanning electron microscopy (FE-SEM) images of apoferritin protein molecules (having 1000 cobalt atoms per apoferritin protein molecule core) immobilized on a holey carbon coated copper calibration grid; the scale bars are 40 nm and 20 nm, respectively.
Figure 1C:
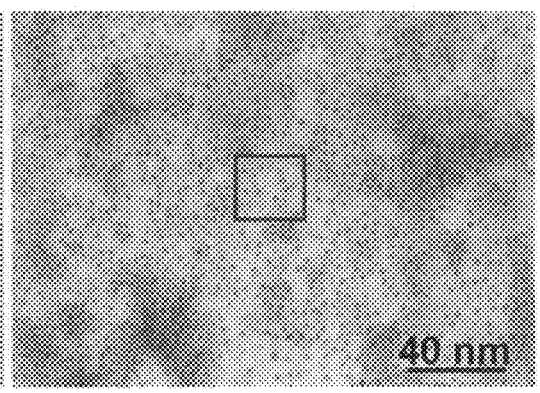
FIG. 1C and FIG. 1D are drawings prepared from field emission-scanning electron microscopy equipped with transmission electron microscopy (STEM) images of apoferritin protein molecules (having 1000 cobalt atoms per apoferritin protein molecule core) immobilized on a holey carbon coated copper calibration grid; the scale bars are 40 nm and 20 nm, respectively.
Figure 1B:
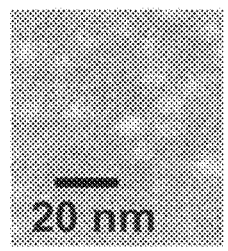
Figure 1D:

To carry out the present process for the fabrication of metallic nanoshells, a first aqueous solution is provided. This first aqueous solution is a buffered solution of molecules of an apoferritin protein. Such apoferritin protein molecules are ferritin protein molecules whose inner metallic cores have been removed, e.g., in vitro by reduction and chelation, employing the molecular channels which run through each ferritin protein molecule from its outer periphery to its inner core. A hollow inner core is thereby presented. A preferred apoferritin protein is an apo horse spleen ferritin protein (ApoHoSF). Very beneficial results are achieved if the first aqueous solution is a 1 mg per ml ApoHoSF solution which has been adjusted to pH 8.5 in 25 mM of MOPS buffer with 50 mM NaCl.

An evenly-distributed loading of metal ions among the apoferritin protein molecules of the first aqueous solution is then provided. This is accomplished by gradually admixing a second aqueous solution, which contains the metal ions, with the first aqueous solution, which contains the apoferritin protein molecules, to form a first admixture. It is preferred if the metal ions are transition metal ions, and more preferable if the ions are of cobalt, iron, manganese, vanadium, nickel, zinc, copper, or silver. Very good results have been obtained if cobalt is employed in the present process. Especially beneficial results have been obtained if the second aqueous solution is a 50 mM solution of cobalt sulfate.

The loading or number of metal atoms per individual apoferritin protein molecule in the first admixture is determined by calculation, employing the volume of the second aqueous solution employed along with the concentration of metal ions therein, as well as the volume of the first aqueous solution employed along with the concentration of apoferritin protein therein. The optimal loading is determined empirically, as discussed below.

A third aqueous solution is then admixed with the first admixture. The third aqueous solution contains a calculated excess of oxidizing agent for the metal ions employed. Especially good results are obtained if the third aqueous solution is a 3 volume percent solution of hydrogen peroxide.

The mechanism for the formation of metallic nanoshells is considered to be as follows: Metal ions enter into the hollow core of each of the apoferritin molecules through the molecular channels therein. Chemical bonds are then formed between the metal ions and functional groups which are located on the wall of the hollow core of each apoferritin molecule during oxidation of the metal ions by the oxidizing agent. As discrete metallic nanoparticles are formed and then merged within the hollow core, a composite metallic nanoshell is formed on the wall of the hollow core where it is attached thereto, instead of a single, solid, composite metallic nanoparticle being formed within the core.

The optimal number of metal atoms per individual apoferritin protein molecule is empirically determined as that number of metal atoms which is sufficient to provide a subatantially integral, composite metallic nanoshell formed within, and attached to the wall of the hollow core, but which is insufficient to provide an integral, composite spherical metallic nanoparticle which, although formed within, and attached to the wall of the hollow core, has no empty space in the center thereof.

Very beneficial results are obtained in the practice of the present invention if the number of metal atoms per individual apoferritin protein molecule is within the range of about 1000-2000.

EXAMPLES

The following Examples are presented as being illustrative of the present invention, and are not intended to limit its scope.

ApoHoSF solution (1 mg/ml) was adjusted to a pH 8.5 in 25 mM MOPS buffer with 50 mM NaCl. $CoSO_4$ (50 mM) was used as a cobalt source and gradually added to the ApoHoSF solution, followed by the addition of an excess amount of $H_2O_2$ (3 vol. %). The Cobalt was added very slowly and gradually to achieve a certain loading of metal atoms evenly distributed into the ferritin. We reconstituted the ferritins having 200 Co ($Co_{200}$) to 2000 Co ($Co_{2000}$) atoms per ferritin in increments of 200 atoms.

Field emission-scanning electron microscopy (FE-SEM), and FE-SEM equipped with a scanning transmission electron microscopy (STEM, Hitachi S-5200) were used for the characterization of reconstituted Co-cored ferritins. Immobilized Co-cored ferritins on a holey carbon coated copper calibration grid were thoroughly rinsed with doubly distilled, deionized water, dried in a vacuum atmosphere, and then subjected to microscopic analysis. FE-SEM and STEM were used to obtain the whole images at the same acceleration voltage of 25 keV. FIGS. 1A, 1B, 1C and 1D show FE-SEM and STEM images of reconstituted Co-cored ferritins on a copper calibration grid. The STEM (FIGS. 1C and 1D) images show a clear view of solid cores without protein shell at a relatively low magnification. Ultraviolet-visible (UV-Vis) spectra were obtained from a Perkin-Elmer Lambda 900 light source. The ferritin protein in micro quartz cuvette was adjusted to the final concentration of 0.33 mg/ml diluted with 25 mM MOPS buffer at pH 8.5. The transmission spectra were measured from 900 nm to 200 nm at a scan speed of 150 nm/min.

Figure 2A:
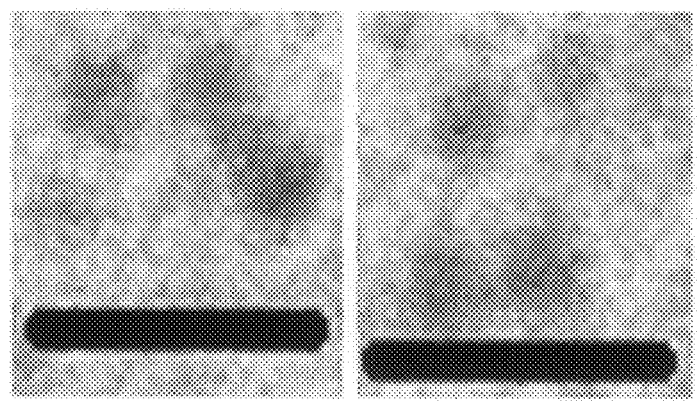
FIG. 2A is a drawing prepared from a STEM image of apoferritin protein molecules (having 200 cobalt atoms per apoferritin protein molecule core), immobilized on a holey carbon coated copper calibration grid; the scale bar is 8 nm.
Figure 2B:
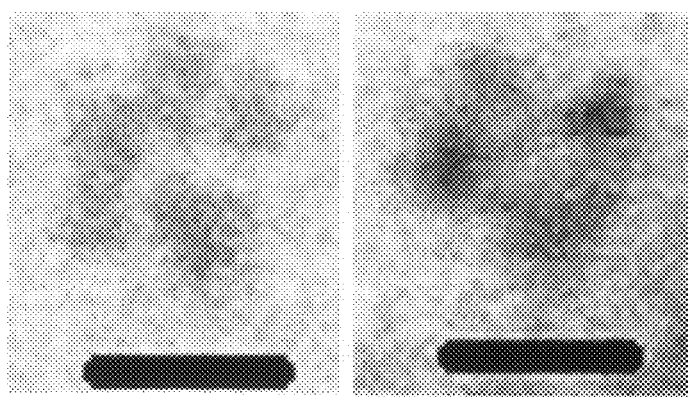
FIG. 2B is a drawing prepared from a STEM image of apoferritin protein molecules (having 1000 cobalt atoms per apoferritin protein molecule core) immobilized on a holey carbon coated copper calibration grid; the scale bar is 5 nm.
Figure 2C:
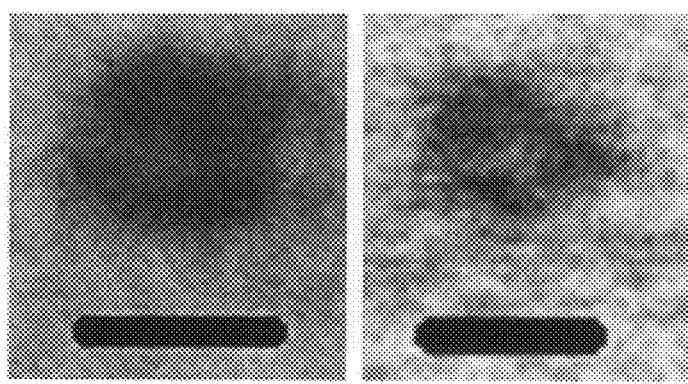
FIG. 2C is a drawing prepared from a STEM image of apoferritin protein molecules (having 2000 cobalt atoms per apoferritin protein molecule core) immobilized on a holey carbon coated copper calibration grid; the scale bar is 5 nm.

FIGS. 2A, 2B and 2C are scanning transmission electron microscopy (STEM, Hitachi S-5200) images of reconstituted Co-cored ferritins on a holey carbon coated calibration grid. When the ferritin contains 200 Co atoms in the ferritin interior, cobalt oxides were formed and evenly distributed on the ferritin interior wall (FIG. 2A). The size of cobalt oxides was 2 nm. We can only see the metal cores in the ferritin through STEM imaging due to the relatively low density of the ferritin protein shell. Normally, eight hydrophilic channels along the four fold symmetric axis of the apoferritin protein shell are considered to be the pathways of metal ions into the ferritin interior. Once the metal ions enter the ferritin interior, they form chemical bonds during the oxidation process of the metal ions with the functional groups of the interior protein wall. It is very likely that the metal oxides are combined with carboxylate groups on the interior protein wall. The cobalt is thus attached to the inside wall of the hollow protein core. If there was not an interaction with the interior protein wall, a single nanoparticle would be formed within and not attached to the hollow core of an apoferritin in order to reduce surface tension. Once the seeds of metal oxides are formed, the nanoparticles inside the apoferritin grow auto-catalytically along the interior wall of the hollow core and then merge together during repetitions of Co(II) and $H_2O_2$ additions.

Figure 3A:
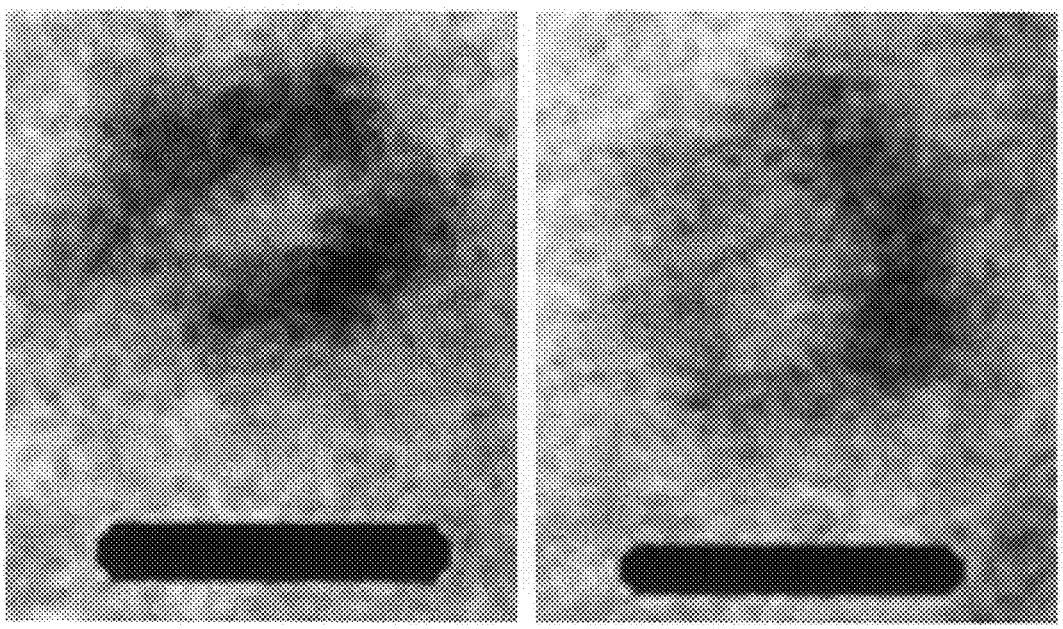
FIG. 3A is a drawing prepared from a STEM image of apoferritin protein molecules (having 1000 cobalt atoms per apoferritin protein molecule core) immobilized on a holey carbon coated copper calibration grid; the scale bar is 5 nm.
Figure 3B:
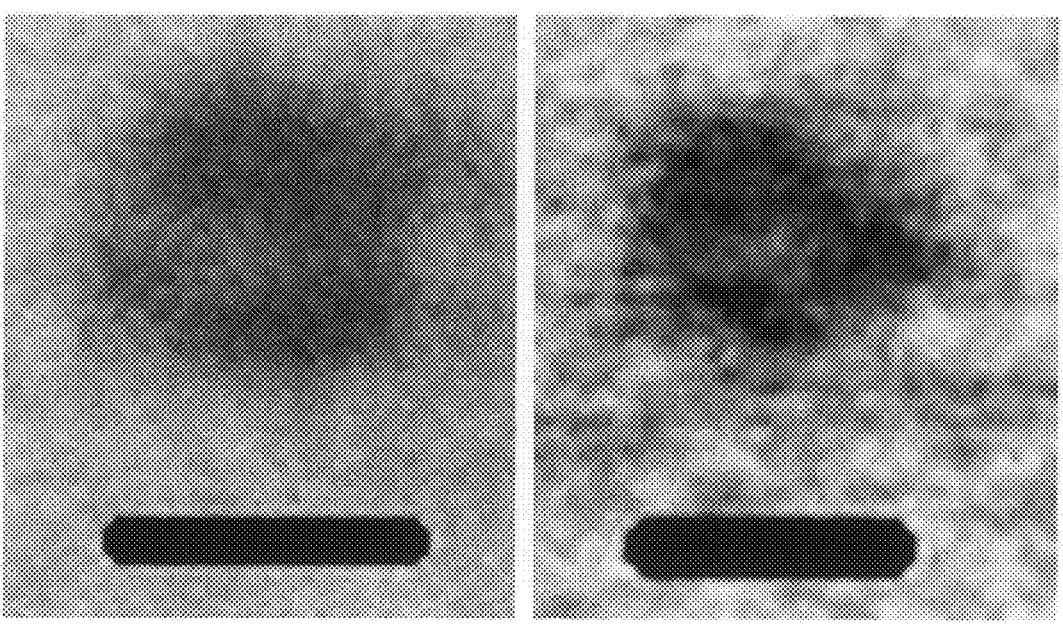
FIG. 3B is a drawing prepared from a STEM image of apoferritin protein molecules (having 2000 cobalt atoms per apoferritin protein molecule core) immobilized on a holey carbon coated copper calibration grid; the scale bar is 5 nm.

When the ferritin contains over 1000 Co atoms, the cobalt oxides form a hollow nanoparticle in the ferritin interior (FIG. 2B). STEM images show a clear circle with a hollow core through merging of the nanoparticles (FIG. 2B). The size of hollow nanoparticle was about 6 nm, which is smaller than the inner diameter of the hollow apoferritin core. FIGS. 3A and 3B show STEM images of reconstituted Co-cored ferritins with different numbers of cobalt atoms. The wall thickness and size of hollow $Co_{2000}$ (FIG. 3B) core are somewhat larger than $Co_{1000}$ core (FIG. 3A).

Figure 4:
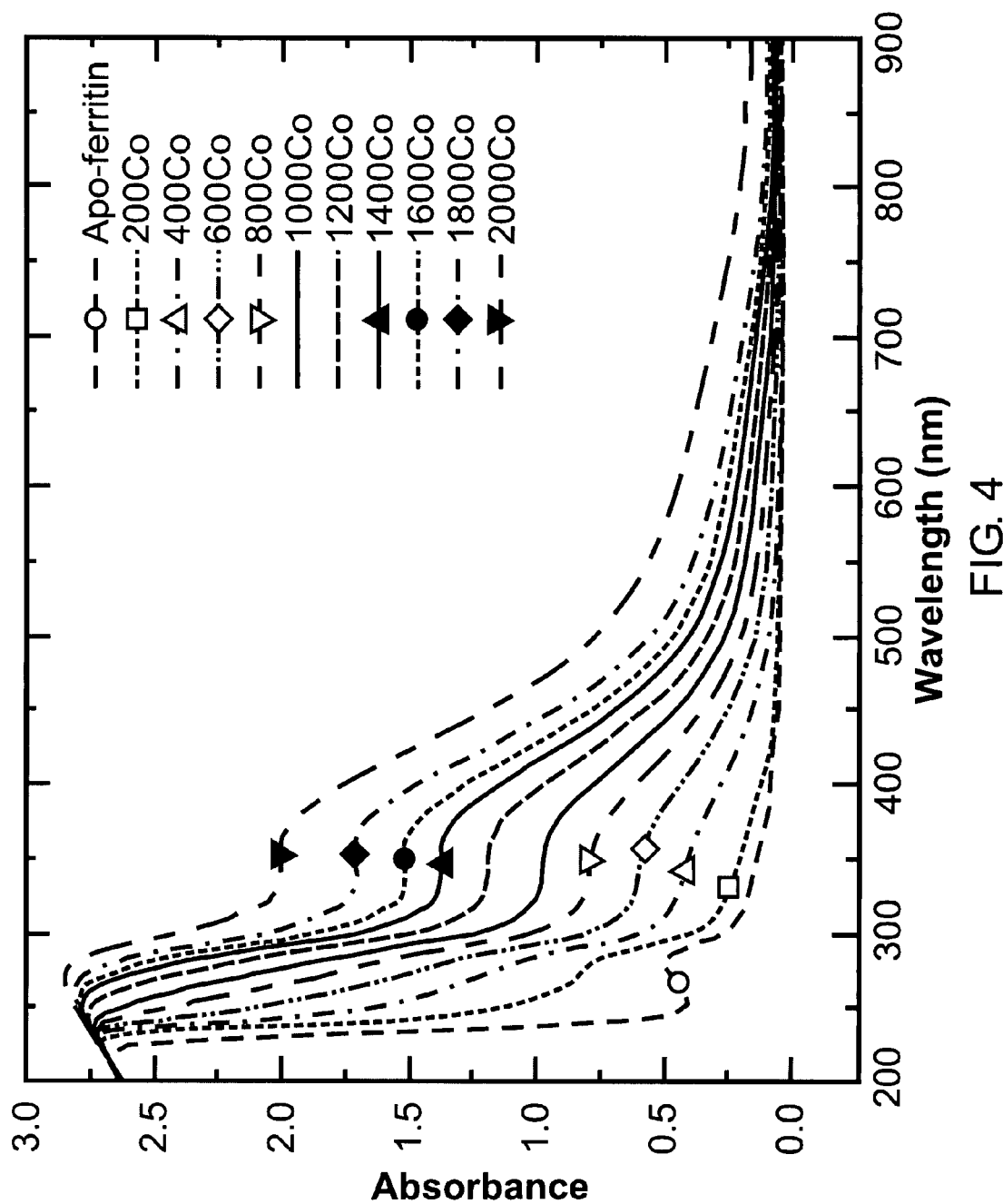
FIG. 4 is a plot of absorbance vs. wavelength showing UV-Visible absorption spectra of apoferritin and various cobalt oxide-containing apoferritins.

Mineralized ferritin solution with Co(II) and $H_2O_2$ showed a homogeneous olive-green color from the specific oxidative mineralization process at pH 8.5. The UV-Visible absorption spectra showed well-defined peaks at 280 nm (protein) and 225 nm with a shoulder at 350 nm (corresponding to cobalt oxides, especially cobalt oxyhydroxide (CoOOH)). (See FIG. 4). Addition of the Co(II) and $H_2O_2$ to the ApoHoSF solution results in the convolution of the protein absorption band at 280 nm with a new absorption band at 225 nm, having a shoulder at 350 nm. These two peaks related to the core material shifted to the higher wavelengths as the number of metal atoms increased within the ferritin.

Figure 5:
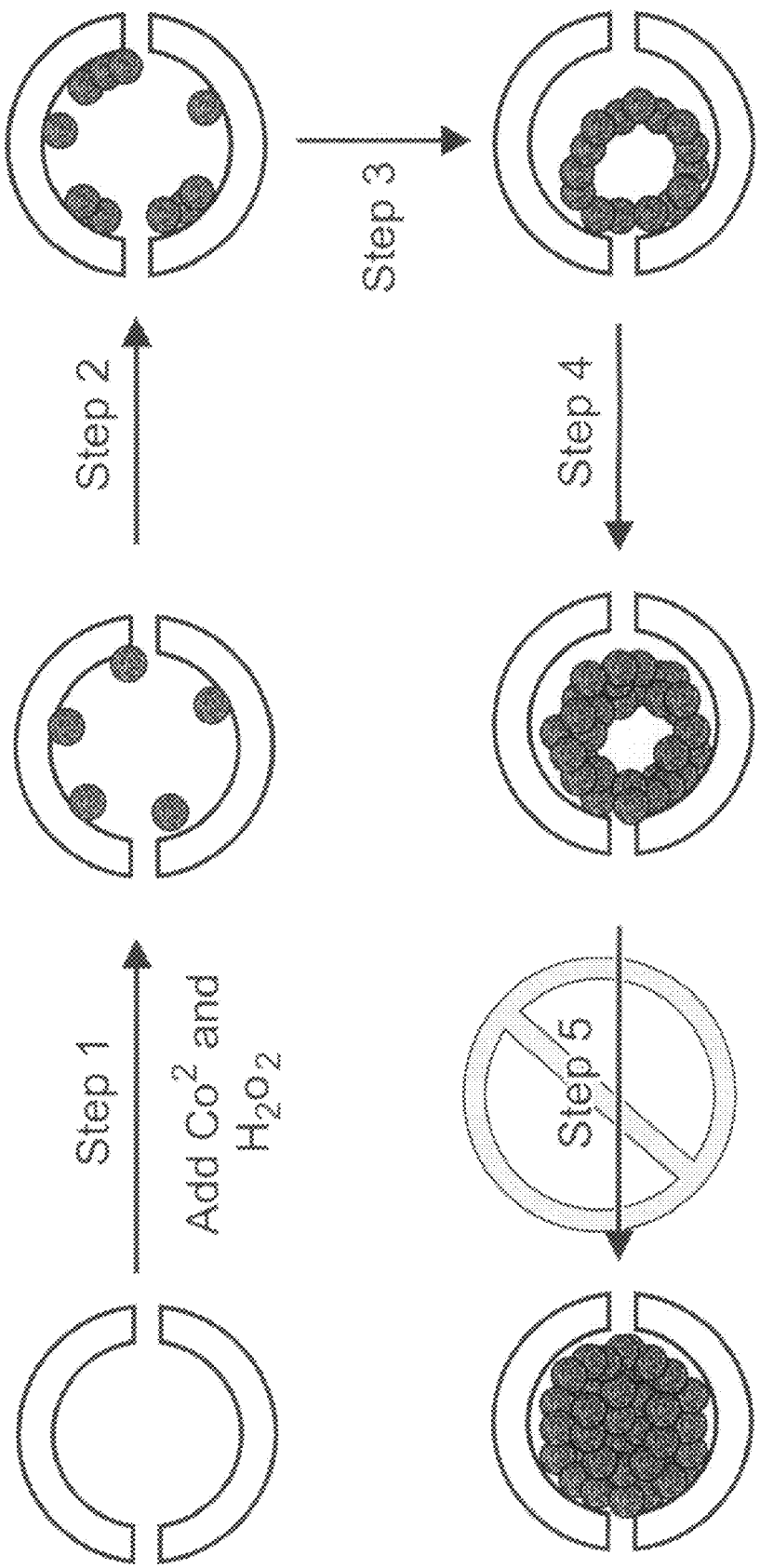
FIG. 5 is a schematic depicting the growth mechanism for incremental numbers of cobalt oxide units introduced into the hollow core of an apoferritin protein molecule.

The first step of metal nanoshell formation is a nucleation of small nanoparticles in the interior (hollow core) of the ferritin protein shell. Referring now to FIG. 5, it is considered that the metal ions entered through the hydrophilic channels in the ferritin and combined with the carboxylate groups of the ferritin interior wall, thus forming discrete nanoparticles during an oxidative reaction along the ferritin interior wall (Step 1). The discrete nanoparticles continue to grow along the ferritin interior wall (Step 2). In a merging step, a hollow nanoparticle forms through the merging of discrete nanoparticles (Step 3). The size of a particular hollow nanoparticle is somewhat decreased because of the formation of metallic bonds. Finally, the hollow nanoparticle is grown with a thicker metal wall (Step 4). The nanoparticle formed has an empty core at this point. This is why one should not completely fill in the ferritin interior or hollow core with a theoretical number of Co atoms through the reconstitution procedure. Employing this growth mechanism renders hollow metal nanoparticles or metal nanoshells easily by controlling the number of metal atoms entering the interior or hollow core of the apoferritin.

We claim:

1. A process for the fabrication of metallic nanoshells, which process comprises:
   (a) providing a first aqueous solution, which is a buffered solution of an apoferritin protein, wherein the apoferritin protein is selected from the group consisting of horse spleen ferritin and bacterial ferritin, each of the individual molecules of said apoferritin protein having molecular channels running therethrough from the outer periphery thereof to an inner core thereof, the channels having enabled removal of substantially all inorganic material from the inner core thereof;
   (b) providing an evenly-distributed loading of metal ions, wherein the metal ions are selected from the group consisting of transition metals and noble metals, among the apoferritin protein molecules of the first solution by forming a first admixture prepared by gradually admixing a second aqueous solution containing the metal ions with the first aqueous solution, the volume of the second aqueous solution employed, along with the concentration of metal ions in the second aqueous solution, being utilized along with the volume of the first aqueous solution employed and the concentration of apoferritin protein in the first aqueous solution, to calculate the number of metal atoms per individual apoferritin protein molecule in the first admixture, the optimum thereof being that number of metal atoms which is sufficient to provide a substantially integral, composite metallic nanoshell formed within, and attached to the wall of the hollow core, but which is insufficient to provide an integral, composite spherical metallic nanoparticle which, although formed within, and attached to the wall of the hollow core, has no empty space in the center thereof;
   (c) gradually admixing a third aqueous solution with the first admixture, the third aqueous solution containing a calculated excess of oxidizing agent for the metal ions employed; whereby metal ions enter into the hollow inner core of each of the apoferritin molecules through the molecular channels therein, chemical bonds being formed between the metal ions and functional groups located on the wall of the hollow core of each of the apoferritin molecules during oxidation of the metal ions by the oxidizing agent, so that as discrete metallic nanoparticles are formed and merged within the hollow core, a composite metallic nanoshell is formed on the wall of the hollow core and attached thereto, instead of a single, solid, composite metallic nanoparticle being formed within the core.

2. The process of claim 1, wherein the optimal number of metal atoms per individual apoferritin protein molecule is within the range of about 1000-2000.

3. The process of claim 1, wherein the metal is a transition metal.

4. The process of claim 3, wherein the metal is selected from the group consisting of cobalt, iron, manganese, vanadium, nickel, zinc, copper and silver.

5. The process of claim 1, wherein the metal is cobalt.

6. The process of claim 1, wherein the first aqueous solution is a 1 mg per ml ApoHoSF solution which has been adjusted to pH 8.5 in 25 mM MOPS buffer with 50 mM NaCl.

* * * * *